United States Patent
Karlsen

[19]

[11] Patent Number: 5,924,741
[45] Date of Patent: Jul. 20, 1999

[54] WEAKLINK DEVICE FOR ELONGATED OFFSHORE ARTICLES

[75] Inventor: Jan Erik Karlsen, Kolbotn, Norway

[73] Assignee: Alcatel, France

[21] Appl. No.: 08/906,915

[22] Filed: Aug. 6, 1997

[30] Foreign Application Priority Data

Sep. 6, 1996 [NO] Norway ..................................... 963716

[51] Int. Cl.⁶ .................................................. F16L 37/08
[52] U.S. Cl. ........................ 285/3; 285/124.1; 285/124.3; 285/83
[58] Field of Search ............................. 285/2, 3, 124.1, 285/124.3, 82, 83, 84, 85, 319

[56] References Cited

U.S. PATENT DOCUMENTS

| | | | |
|---|---|---|---|
| 2,843,399 | 7/1958 | Arterbury et al. | 285/3 |
| 3,288,493 | 11/1966 | Brown | 285/3 |
| 3,489,436 | 1/1970 | Ahlstone | 285/83 |
| 3,499,665 | 3/1970 | Conrad | 285/3 |
| 3,521,909 | 7/1970 | Brown | 285/3 |
| 4,281,711 | 8/1981 | Braddick et al. | 285/3 |
| 4,285,533 | 8/1981 | Silberman et al. | 285/2 |
| 4,364,587 | 12/1982 | Samford | 285/3 |
| 4,405,017 | 9/1983 | Allen et al. | 285/3 |
| 4,452,472 | 6/1984 | Crase | 285/3 |
| 4,457,368 | 7/1984 | Knierimen et al. | 285/3 |
| 4,531,766 | 7/1985 | Crase | 285/3 |
| 4,601,492 | 7/1986 | George | 285/3 |
| 4,696,493 | 9/1987 | Brammer | 285/3 |

*Primary Examiner*—Eric K. Nicholson
*Attorney, Agent, or Firm*—Ware, Fressola, Van der Sluys & Adolphson LLP

[57] ABSTRACT

The present invention relates to a weaklink device for controlled breaking of at least one interconnection (5) on an elongated article (2) such as an umbilical comprising one or more elongated elements such as metal tubes (3,4), said interconnection being of the disconnectable type having two coupler parts (6,7).

The weaklink include
  first retaining means (15,16) for maintaining a controlled interconnection or plug-in/out of the tubes elements (3,4),
  second retaining means (18) for making the device independent of internal fluid pressure within the tubes elements (3,4) of the elongated article and
  third retaining means (13) for locking the second retaining means (18), said third retaining means being arranged to yield at a certain longitudinal pull or tension for controlled breaking of at least one interconnection (5) on an elongated article (2) such as an umbilical comprising one or more elongated elements such as metal pipes or tubes (3,4), said interconnection being of the disconnectable type having two coupler parts (6,7).

10 Claims, 2 Drawing Sheets

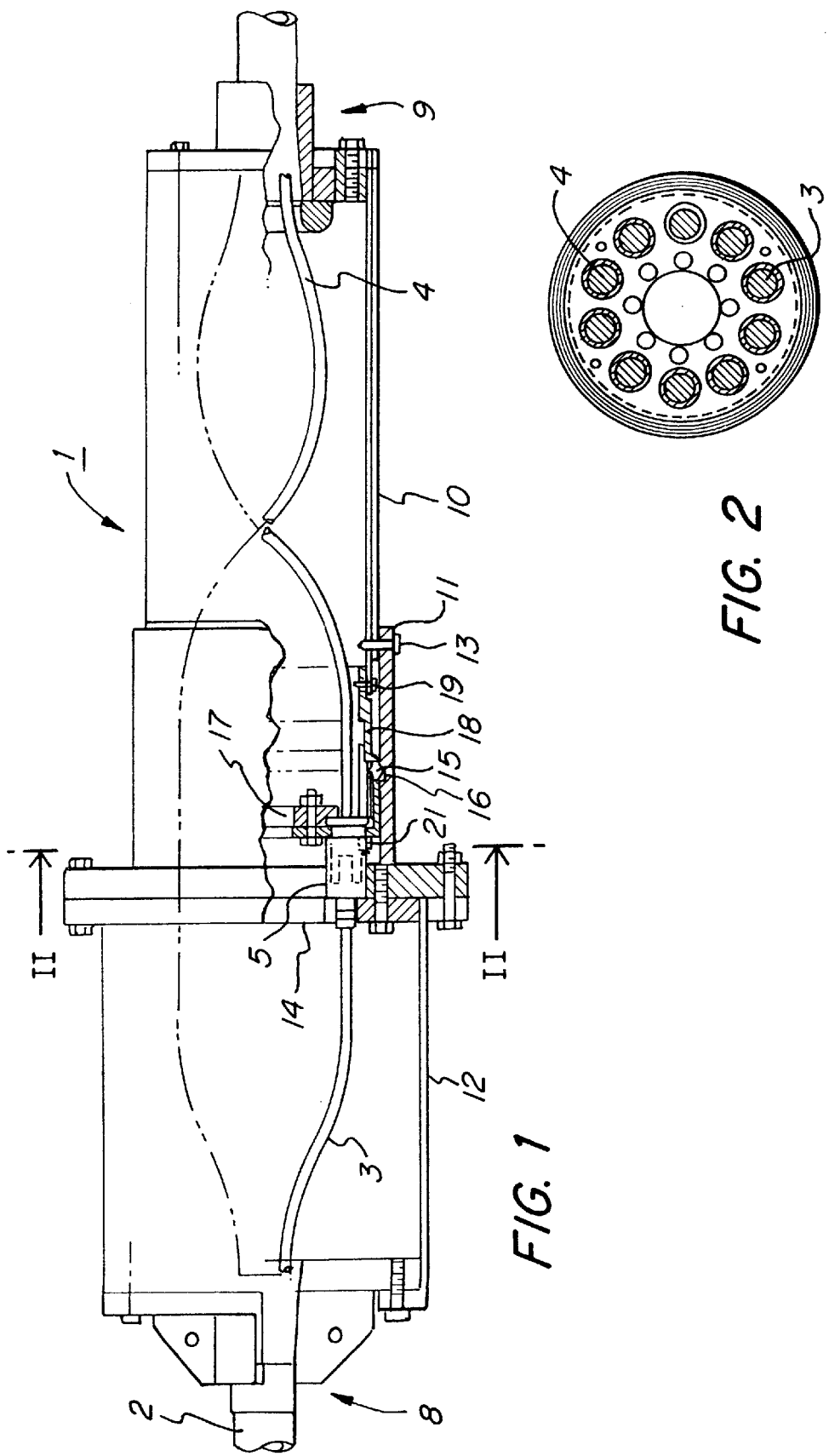

WEAKLINK DEVICE FOR ELONGATED OFFSHORE ARTICLES

BACKGROUND OF THE INVENTION

1. Technical Field

The present invention relates to so called 'weaklink' devices for elongated offshore articles such as umbilicals containing at least one pipe or tube where at least one end of the article is terminated on an offshore subsea installation or platform: There is a great risk of damaging the subsea installation itself if the elongated article is subjected to unforeseeable pulling forces or tension caused by ships anchors and fishing gear.

2. Description of the Prior Art

The elongated article concerned contain flow lines for fluids and control conductors of various kinds, such as hydraulic steel tubes, —and possibly power conductors and/or telecommunication conductors. Such articles are rather expensive and their repair is difficult and takes considerable time, especially in rough offshore environments. The damage that could be caused to the subsea installation by pulling the elongated article, is, however, prohibitive.

The elongated article usually interconnects installations on the seabed. One problem which arises in connection with such installations is that connectors are not easily disconnectable and that high and varying fluid pressure within the tubes interferes with defined release forces. In case of emergency it must be possible to release the article from the subsea installation very rapidly, and the preferred solution has therefore been to cut the article if it is subjected to a defined pulling force. Difficulties arise when the article contain steel tubes instead of rubber hoses.

SUMMARY OF THE INVENTION

The object of the present invention is therefore to provide an improved weaklink device for elongated offshore articles, so that the article can be released without damaging fixed platforms and seabed installations.

The main features of the invention are defined in the accompanying claims. With the defined device, the elongated article can be released rapidly and safely without damaging the fixed installations. The release force can be designed to satisfy customers needs.

The basic idea is to make the force required to cut break pins independent of pressure required to interconnect steel tubes. These tubes contain pressurized oils and fluids of various kinds, and the weaklink device contain hydraulic couplers (and possibly electrical connectors). When the weaklink is released, —the couplers are disconnected without causing leakage of fluids and pollution of the environments when the couplers are of the self-sealed type.

The solution is to make the disconnection in two steps. An advantage is that this solution is not complicated.

BRIEF DESCRIPTION OF THE DRAWING

Above mentioned and other features and objects of the present invention will clearly appear from the following detailed description of embodiments of the invention taken in conjunction with the drawing, where FIG. 1 illustrates the principles of the weaklink device of the present invention, FIG. 2 shows a crossection through line II—II of FIG. 1.

DETAILED DESCRIPTION OF THE INVENTION

Figure 4:
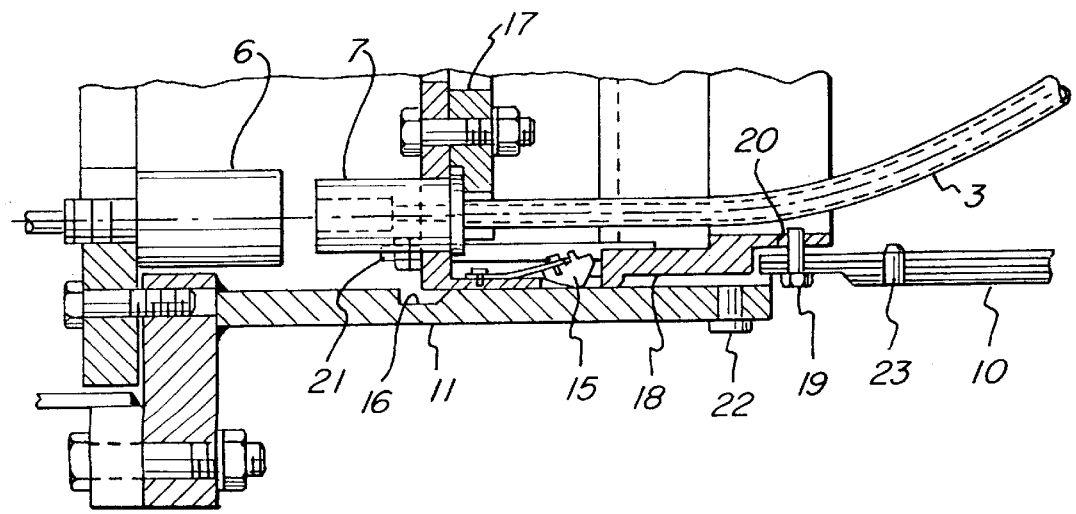
FIG. 4 illustrates the full slide-off of the weaklink connector.

In FIG. 1 is shown—in partial crossection—a weaklink device 1 arranged on an elongated offshore article 2 containing a number of tubes 3 and 4. FIG. 2 shows a cut through line II—II of FIG. 1 and a number of ten steel tubes are indicated. This number may be higher or lower and the article may also contain electrical and optical cables. All of the elongated elements within the article are interconnected within the weaklink device with disconnectable couplers 5. The two parts 6 and 7 of a coupler are indicated in FIG. 4. Between the two ends 8 and 9 of the weaklink device 1 the elongated elements are protected by a first inner housing 10, a second outer housing 11 and a third housing 12. The elongated article 2 is usually provided with armor which is secured to the first and third housing. The first and second housing are interconnected with one or more break pins 13 which will break at a predetermined pull or tension of some 15 to 20 tons (15–20.000 kgs). A number of break pins should preferably be distributed around the surface of the construction and they should be dimensioned in accordance with requirements on a case by case basis.

The (self-sealed) coupler parts 6 are fixed to a plate 14 interconnected with the outer housing 11, whereas the (self-sealed) coupler parts 7 are interconnected with the inner housing 10. Electrical and optical cables have no internal pressure, but the tubes 3 and 4 which convey fluids under pressure must be interconnected with means to maintain the internal fluid pressure. Such internal pressure may vary from zero to some 1.000 kgs for each ½" tube, —so that ten tubes could give a resulting internal pressure of some 10.000 kgs.

In order to make the pin break force required to break the pins 13 independent of the varying internal pressure within the various tubes 3 and 4, there is arranged first retaining means consisting of one or more spring loaded locking arms 15 which are fitted into grooves 16 in the outer housing. The arm 15 is fixed to a plate assembly 17 holding the coupler parts 7. When the arm 15 is locked within the groove 16 by a second retaining means consisting of sliding means 18 interconnected with the inner housing 10, the force required to interconnect the parts 6 and 7 is quite independent of the force required to break the pin 13. The sliding means 18 may be a part of the inner housing 10, and it may—as illustrated—be interconnected with the inner housing by means of a pin 19 and hole 20 arrangement. The pin 19 is fixed to the inner housing 10 whereas the hole 20 in the sliding means 18 has a larger diameter than the diameter of the pin 19 to obtain a certain slack which is effective when the break pins 13 are cut. The force required to cut the break pin 13 is therefore also independent of the possible force required to pull the coupler part 7 from the coupler part 6.

In FIG. 1, the break pin 13 is intact and the pin 19 (FIG. 2) engages the left hand side of the hole 20 to ensure that the sliding means 18 locks the arm 15 within the groove 16.

Figure 3:
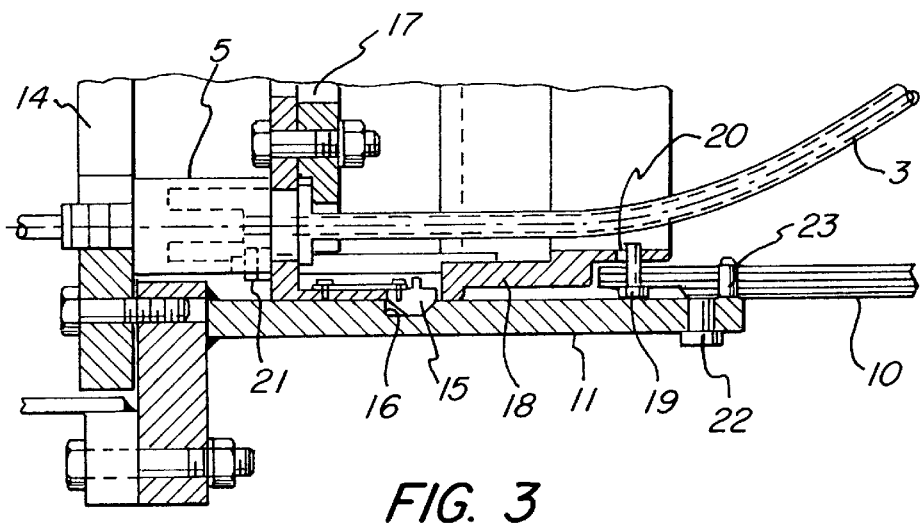
FIG. 3 shows a situation just after the break pin has been cut.

As illustrated in FIG. 3—and FIG. 4—the sliding means 18 may be interconnected with the plate assembly 17 by means of a slack bolt/nut arrangement 21 working as will be explained later.

If the elongated article 2 resting on the seabed is subjected to undue pulling forces caused by ships anchors or fishing gear or other unforseen events—and the break strength of the pin 13 is exceeded—the situation shown in FIGS. 3 and 4 will occur. The following events will now take place:

The pin 13 will be broken in two parts 22 and 23.

The inner housing 10 will move to the right (or the outer housings 11,12 will move to the left).

The pin 19 which was situated to the left in the hole 20 moves to the right in the hole 20 thereby starting to pull on the sliding means 18. In FIG. 3 the arm 18 has moved so far to the right that the spring loaded arm 15 is just free.

The bolt/nut arrangement 21 catches the plate assembly 17.

The spring loaded arm 15 slides up and out of the groove 16 as illustrated in FIG. 4.

The parts 6, 7 of the couplers are disconnected and the whole assembly consisting of the inner housing 10, the sliding means 18, the plate assembly 17 and the coupler part 7 moves away from the plate 14 and the coupler part 6 so that the subsea installations to which the elongated article 2 is connected are not damaged.

The weaklink construction of the present invention is simple and makes the force required to cut break pins independent of pressure required to interconnect pressurized steel tubes. It is resistant against wear and tear, corrosion and vibrations, designed both for factory and field installation and it is designed for being mechanically released, The above detailed description of embodiments of this invention must be taken as examples only and should not be considered as limitations on the scope of protection.

The weaklink concerned is of the type that cannot be reconnected on the seabed. The elongated article will have to be lifted to the surface for reconnection and installment of fresh break pins. A weaklink that could be reconnected at the seabed would be more complicated and expensive.

I claim:

1. Device for controlled breaking of at least one interconnection of elongated articles having at least one pair of elongated elements, the device comprising:

(a) two disconnectable coupler parts interconnecting each pair of elongated elements;

(b) first retaining means for maintaining a controlled interconnection of the disconnectable coupler parts interconnecting each pair of elongated elements;

(c) second retaining means cooperating with the first retaining means for maintaining the controlled interconnection of the disconnectable coupler parts interconnecting each pair of elongated elements; and (d) third retaining means for locking the second retaining means into cooperation with the first retaining means for maintaining the controlled interconnection of the disconnectable coupler parts interconnecting each pair of elongated elements, the third retaining means being arranged to yield at a certain longitudinal tension independent of any internal fluid pressure within the elongated elements to unlock the second retaining means from cooperation with the first retaining means for maintaining the controlled interconnection of the disconnectable coupler parts interconnecting each pair of elongated elements.

2. Device according to claim 1, wherein the first retaining means includes at least one springloaded arm which is arranged on a first part of the device containing one of the coupler parts and which may be locked into a released from a corresponding groove arranged in a second part of the device containing the other coupler part, said first retaining means being capable of withstanding a predetermined internal pressure within the interconnected element.

3. Device according to claim 2, wherein the second retaining means includes sliding means which in a first position locks the first retaining means and which in a second position release the first retaining means.

4. Device according to claim 3, wherein the third retaining means includes at least one break pin which is arranged between an inner housing and an outer housing containing the coupler parts.

5. Device according to claim 4, wherein the sliding means is flexibly interconnected with the third retaining means so that the force required to cut the at least one break pin is also independent of the possible force required to pull the coupler parts apart.

6. Device according to claim 1, wherein the second retaining means includes sliding means which in a first position locks the first retaining means and which in a second position release the first retaining means.

7. Device according to claim 6, wherein the third retaining means includes at least one break pin which is arranged between an inner housing and an outer housing containing the coupler parts.

8. Device according to claim 7, wherein the sliding means is flexibly interconnected with the third retaining means so that the force required to cut the at least one break pin is also independent of the possible force required to pull the coupler parts apart.

9. Device according to claim 6, wherein the sliding means is flexibly interconnected with the third retaining means so that the force required to cut the at least one break pin is also independent of the possible force required to pull the coupler parts apart.

10. Device according to claim 1, wherein the third retaining means includes at least one break pin which is arranged between an inner housing and an outer housing containing the coupler parts.

* * * * *

UNITED STATES PATENT AND TRADEMARK OFFICE
CERTIFICATE OF CORRECTION

PATENT NO. : 5,924,741
DATED : July 20, 1999
INVENTOR(S) : Jan Erik Karlsen

It is certified that error appears in the above-indentified patent and that said Letters Patent is hereby corrected as shown below:

In column 4, line 10 (claim 2, line 4), "a" should be --and--.

Signed and Sealed this

Twenty-third Day of November, 1999

*Attest:*

Q. TODD DICKINSON

*Attesting Officer*   Acting Commissioner of Patents and Trademarks